(12) United States Patent
Cannon et al.

(10) Patent No.: US 6,678,824 B1
(45) Date of Patent: Jan. 13, 2004

(54) APPLICATION USAGE TIME LIMITER

(75) Inventors: Joseph M. Cannon, Harleysville, PA (US); Philip D. Mooney, North Wales, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/432,119

(22) Filed: Nov. 2, 1999

(51) Int. Cl.$^7$ .............................. H04L 9/32; G06F 17/60
(52) U.S. Cl. ......................................... 713/200; 705/59
(58) Field of Search .................................. 713/502, 200, 713/151; 705/412, 59; 455/405

(56) References Cited

U.S. PATENT DOCUMENTS

| | | | | |
|---|---|---|---|---|
| 4,791,565 A | * | 12/1988 | Dunham et al. | ............ 713/200 |
| 5,621,787 A | * | 4/1997 | McKoy et al. | ......... 379/121.06 |
| 5,673,315 A | * | 9/1997 | Wolf | ............................ 705/59 |
| 5,708,709 A | * | 1/1998 | Rose | ............................ 705/59 |
| 5,716,273 A | | 2/1998 | Yuen | |
| 5,743,743 A | | 4/1998 | Ho et al. | |
| 5,883,954 A | * | 3/1999 | Ronning | ...................... 705/52 |
| 5,907,831 A | * | 5/1999 | Lotvin et al. | .................. 705/14 |
| 5,940,504 A | | 8/1999 | Griswold | |
| 5,983,196 A | * | 11/1999 | Wendkos | ...................... 705/14 |
| 6,113,495 A | * | 9/2000 | Walker et al. | ................ 463/42 |
| 6,502,079 B1 | * | 12/2002 | Ball et al. | ...................... 705/59 |

FOREIGN PATENT DOCUMENTS

WO    WO 9534857 A1  * 12/1995  ............. G06F/9/44

* cited by examiner

*Primary Examiner*—Dennis M. Butler
*Assistant Examiner*—Eric Chang
(74) *Attorney, Agent, or Firm*—William H. Bollman (57) ABSTRACT

An application usage time limiter monitors certain pre-configured application programs when opened or otherwise executed on a computer (e.g. a PC). The application usage time limiter is itself a program running either as a front end to various selected programs for monitoring, or as a separate program running in a time-sharing operating system environment. Pre-configurable options in a usage limiter configuration file or other memory area are set to limit real time ranges that particular application programs on a particular computer can be started and run, and a limit to a length of time that a specific program (or category of programs-an be operated given a number of available credits for a current user. The user is given credits at a pre-configured rate per hour of usage of an application program designated in the usage limiter configuration file as being beneficial, and the user gives back (or looses) credits at a pre-configured rate per hour of usage for use of programs designated as non-beneficial. Preferably, continued usage of beneficial programs is detected, e.g., by keystrokes. Application programs selected for monitoring in the usage limiter configuration file can be identified on an application by application basis, as a specific category of applications identifiable when the particular application is started, or as being stored in a specific directory (e.g., folder in a Windows™ operating system). A credit-giving (i.e., beneficial program) must be run by a particular user to earn credits before a credit-taking (i.e., non-beneficial program) can be run by that user. Up front credits may be provided to a particular user in a user log.

24 Claims, 6 Drawing Sheets

USAGE LIMITER CONFIGURATION FILE

| APPLICATION PROGRAM | TIME LIMIT(S) | CREDITS GIVEN/HR. | CREDITS TAKEN/HR. (COST) | |
|---|---|---|---|---|
| NETSCAPE | 12PM TO 9PM | 0 | 2 | 202 |
| MYST | 7PM TO 8PM | 0 | 3 | 204 |
| SPELLING BEE | 7AM TO 9PM | 2 | 0 | 206 |
| ⋮ | ⋮ | ⋮ | ⋮ | |
| MATH HELPER | 7AM TO 9PM | 4 | 0 | 208 |
| VIRUS CHECK | NONE | 0 | 0 | 210 |

FIG. 3

USER LOG

| USER | CREDITS REMAINING |
|---|---|
| MOM | 1 |
| DAD | 10 |
| JOHN | 10 |
| ALLIE | 11 |
| ⋮ | ⋮ |

FIG. 4
MONITOR LOG 300

| APPLICATION PROGRAM 320 | USER 322 | TIME OF USAGE 324 | CREDITS GIVEN 326 | CREDITS TAKEN 328 |
|---|---|---|---|---|
| RECIPE HELPER — 302 | MOM | 0:15 | 1 | |
| BASEBALL — 304 | JOHN | 1:47 | 0 | 3 |
| MATH HELPER — 306 | JOHN | 3:17 | 13 | 0 |
| ... | ... | ... | ... | ... |
| SCIENCE — 308 | ALLIE | 3:03 | 12 | 0 |
| BARBIE DRESSUP — 310 | ALLIE | :12 | 0 | 1 |
| RECIPE HELPER — 312 | DAD | 2:32 | 10 | |

APPLICATION USAGE TIME LIMITER

BACKGROUND OF THE INVENTION

1. Field of the Invention

This invention relates generally to computer application programs. More particularly, it relates to a control method and apparatus for flexibly encouraging educational or otherwise beneficial programs and for discouraging non-educational or otherwise non-beneficial computer application programs.

2. Background of Related Art

Computers are wonderful devices. They can do everything, from business to entertainment to teaching. Because of all the benefits and because of the importance of the computer in today's society, parents or guardians often want to encourage their children to use a computer.

However, there is more to life than just the computer, and parents often want their children to balance their use of the computer, or at least the particular application programs used on the computer, perhaps because they may be afraid that they will spend too much time on the computer to the detriment of other learning experiences.

Parental or guardian involvement is an important key to a child's education. However, many people have very busy lives and must balance aspects such as family and work. Thus, computer usage may not be monitored by a parent at all times that a child is using it, either for practical reasons or because the parent wants to instill responsibility in their children without being overprotective.

To this end, the parent or guardian of a child using a computer may want to limit the child's use of certain non-educational or otherwise non-beneficial programs (e.g., computer games), and to encourage the use of other, educational or otherwise beneficial programs (e.g., educational programs).

Since parents are not always able to monitor every minute of computer usage, a conventional technique for automatically limiting usage of a particular computer application is to use a built in time limit for a particular period of play. These conventional programs do limit the length of play, but typically do not limit the number of plays. This may be because computer game companies may not find it in their best interest to limit the amount of time that a given game sold by them can be played. Moreover, these time limiting games typically relate only to the game being played, and not to other, unrelated application programs (or programs by another vendor). Thus, a child having free access to a computer may be able to play many different games (or other non-beneficial programs) for as long as they like, changing games or vendors as the game time limits expire, essentially rendering useless the intent of the time limiting function of the individual games.

There is thus a need for a technique and apparatus for more effectively limiting the use of a computer for certain non-educational or otherwise non-beneficial application programs, while at the same time encouraging use of the computer for preferred, educational or otherwise beneficial application programs.

SUMMARY OF THE INVENTION

In accordance with the principles of the present invention, an application usage time limiter comprises a time limiter, and a usage limiter configuration file including at least one entry associating a first application program with a number of credits given based on usage of the first application program, and at least one entry associating a second application program with a number of credits taken away based on usage of the second application program. The application usage time limiter limits use of the second application program based on a number of available credits for a particular user.

A method of limiting usage of a non-beneficial application program on a computer comprises monitoring an amount of usage of a beneficial application program. An amount of allowed usage of a non-beneficial application program is credited based on the monitored amount of usage of the beneficial application program.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention relates to a configurable application usage time limiter that limits the amount of time a certain application program can be run within a given time limit. Using the application usage time limiter, a parent or guardian can configure certain application programs for monitoring, and then limit the amount of time each user (e.g., child) spends on programs pre-configured as being non-beneficial (e.g., non-educational) based on an amount of time that beneficially configured application programs were run by the same user.

Figure 1:
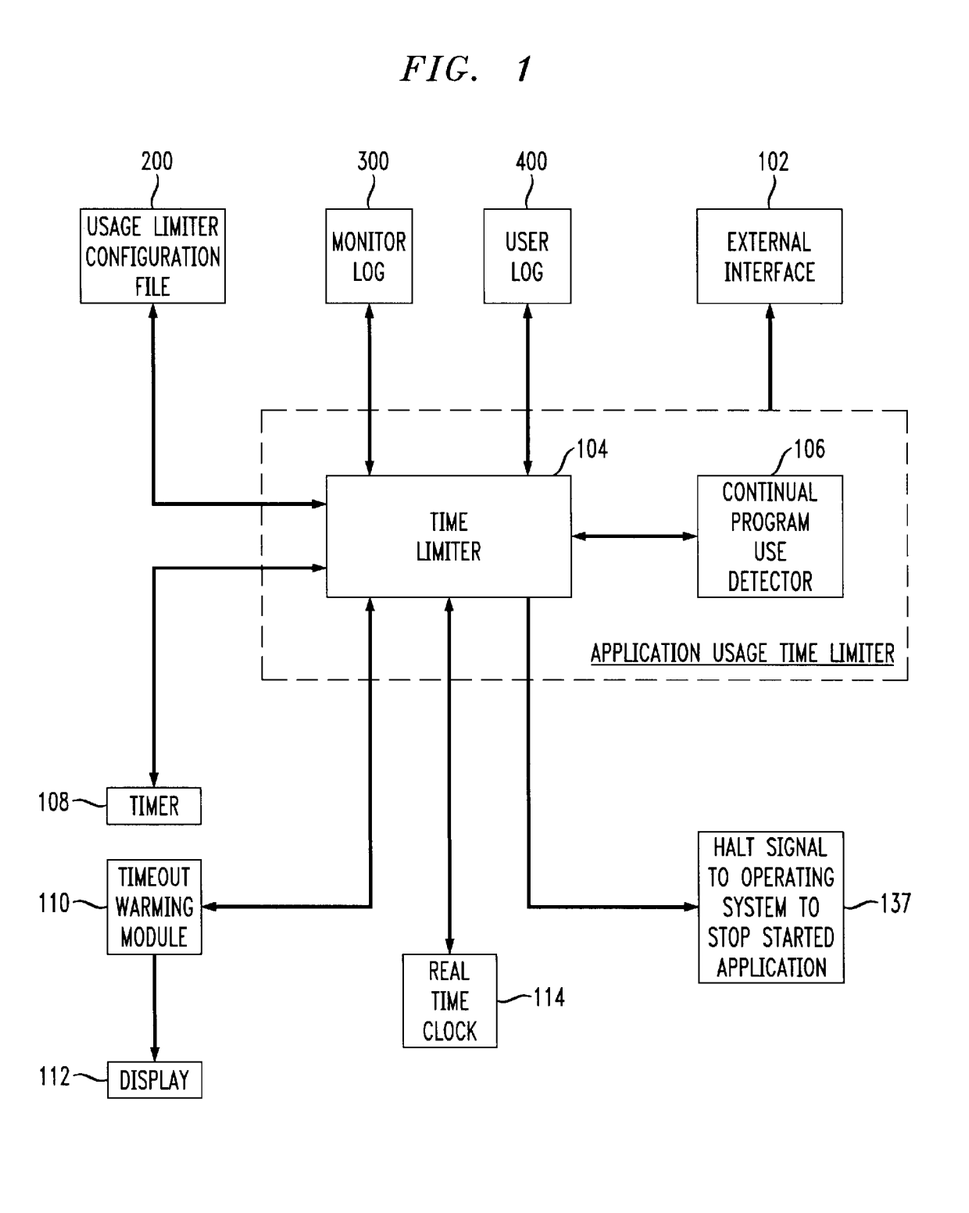
FIG. 1 shows a block diagram of an exemplary application usage time limiter providing a halt signal to an operating system or relevant application program as necessary based on the availability of credits for a particular user or group of users, in accordance with the principles of the present invention.

FIG. 1 shows a block diagram of an exemplary application usage time limiter providing a halt signal to an operating system or relevant application program as necessary based on the availability of credits for a particular user or group of users, in accordance with the principles of the present invention.

In particular, in FIG. 1, an application usage time limiter 100 includes a time limiter 104 function as well as a continual program use detector 106.

The application usage time limiter 100 monitors certain preconfigured or otherwise identified programs when opened, started, or otherwise executed on a computer (e.g. a PC). The application usage time limiter 100 is itself a program running either as a front end to various selected programs for monitoring, or as a background program running in a time-sharing operating system environment (e.g., Windows™).

As a "front end", the application usage time limiter 100 would only allow the program to start if certain configurable conditions were met (e.g., if a credit has been earned by operation of an educational or other credit giving program). As a background monitoring operating system based program, the application usage time limiter 100 would have the ability to terminate or severely restrict the operation of any pre-configured application programs that did not meet pre-determined credit requirements for the particular user.

In the disclosed embodiments, the application usage time limiter 100 is an application program itself, started during the initial boot procedure of the relevant computer. Ideally, the application program will be password protected from termination. The usage monitor will detect and log the startup (and termination) of all application programs started after it.

The time limiter 104 provides a suitable halt application program signal 137 to an operating system (e.g., Windows™).

The Application usage time limiter 100 accesses a number of configuration and monitoring files, e.g., a usage limiter configuration file 200, a monitor log 300, and a user log 400 as necessary. The configuration and monitoring files 200, 300, 400 may be any suitable file, e.g., an Excel™ or other database file, or may simply be locations in memory or on a hard drive associating particular data.

For added security, the monitor log 300 may be encrypted to prevent modification or deletion of entries therein in an attempt to bypass the usage limitations. Moreover, to prevent deletion of the monitor log 300 entirely in an attempt to bypass the usage limitations, if the monitor log 300 doesn't exist, or is not in the expected directory, reconfiguration by the parent or guardian is required before any applications are permitted to run.

Figure 2:
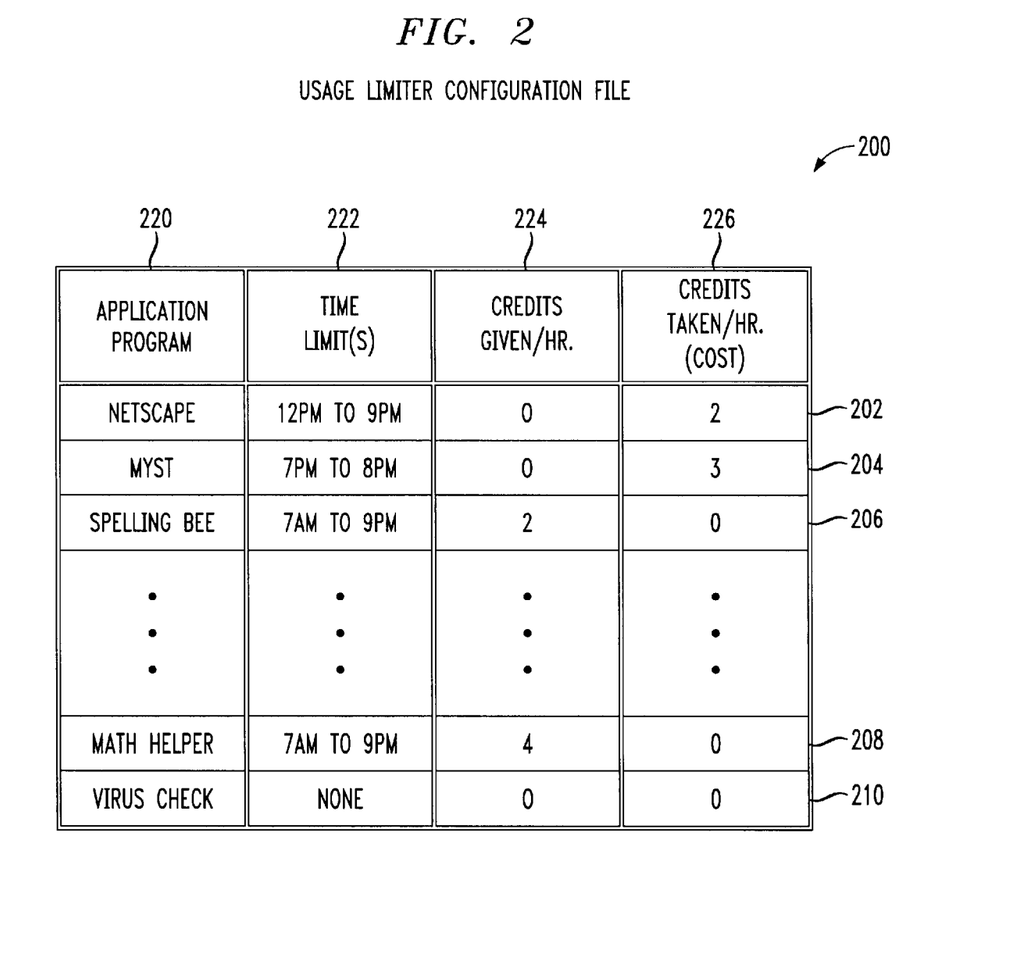
FIG. 2 shows exemplary entries in a usage limiter configuration file shown in FIG. 1.
Figure 3:
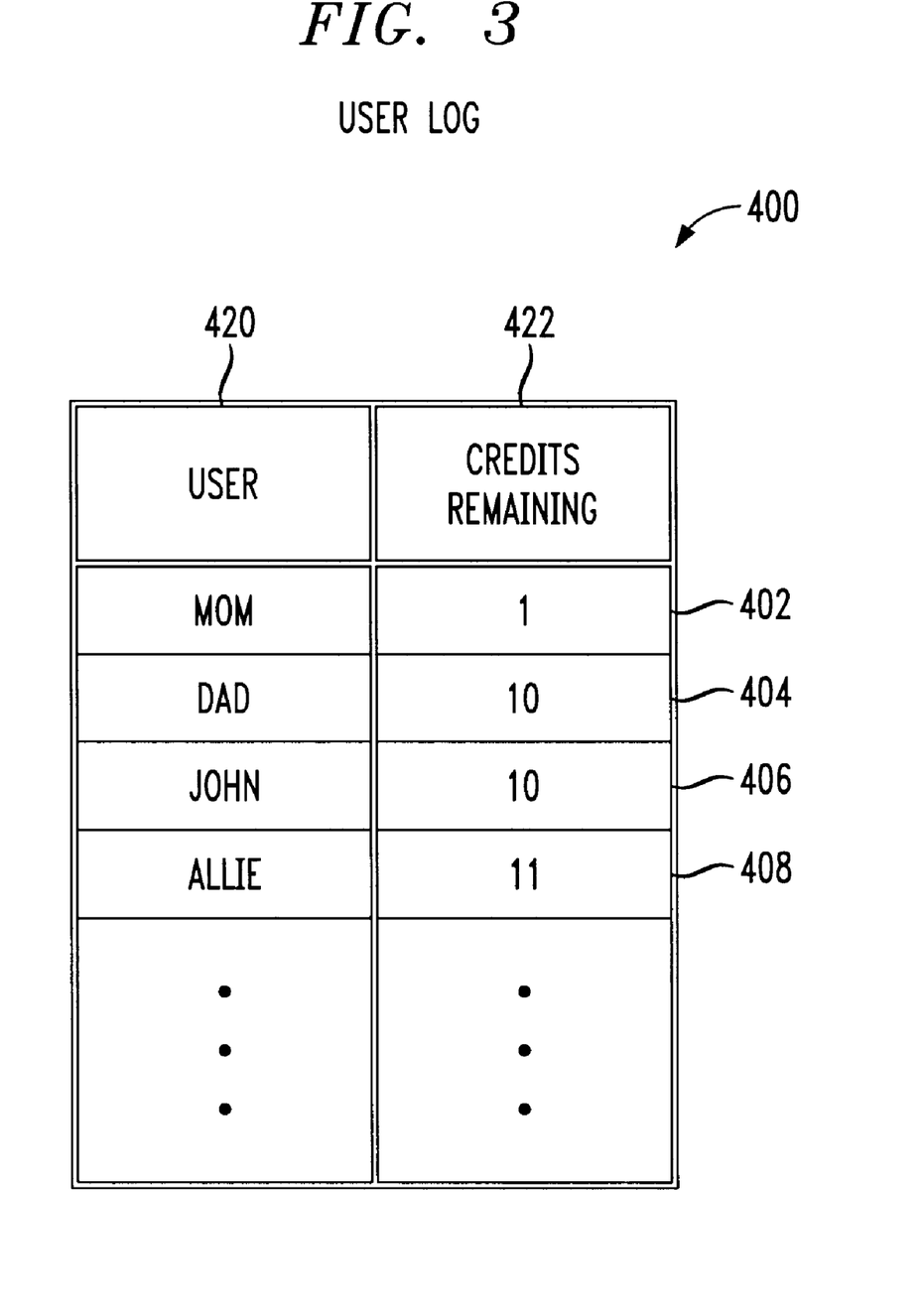
FIG. 3 shows exemplary entries in a user file shown in FIG. 1.
Figure 4:
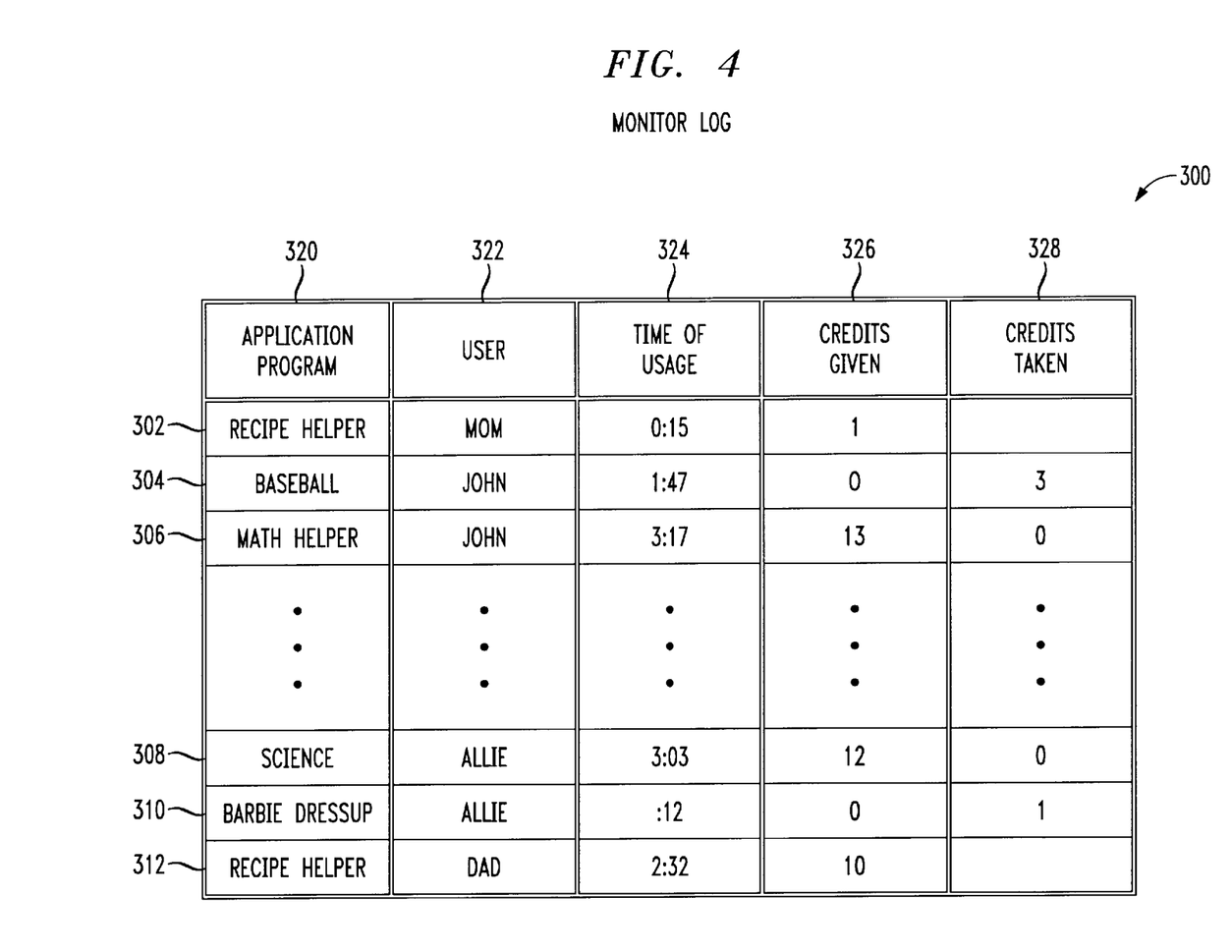
FIG. 4 shows exemplary entries in a monitor log shown in FIG. 1.

FIG. 2 shows exemplary entries 202–210 in a usage limiter configuration file 200, FIG. 3 shows exemplary entries 402–408 in a user log 400, and FIG. 4 shows exemplary entries 302–312 in a monitor log 300.

The time limiter 104 may receive information about starting application programs either directly from a controlling processor in the computer or PC, and/or through an external interface 102 to another computer device. The external interface 102 may be any suitable data interface, e.g., serial such as RS-232, parallel such as RS-422 or Centronix, Universal Serial Bus (USB), etc.

The time limiter 104 utilizes one or more timers 108 as necessary to determine durations of operation of particular pre-configured application programs in allocating credits given or credits taken for a particular user. Upon expiration of all credits for a particular user, or when a user's minimum number of credits (e.g., zero or a negative number) have been exceeded, the time limiter 104 activates a timeout warning module 110.

The timeout warning module 110 may notify the user of the credit deficiency in any appropriate audible or visual manner. For instance, a pop-up window on a suitable display 112 in a Windows™ operating system environment may pause or halt the relevant non-beneficial program, warning the user that credits have expired. A small amount of time may be provided to the user to allow them to manually save parameters of the non-beneficial program before it is terminated in response to the halt signal 137.

The time limiter 104 may also access a real time clock 114 to determine whether or not any monitored application program, beneficial or non-beneficial, is pre-configured for use at that particular time.

As shown in FIG. 2, pre-configurable options in the usage limiter configuration file 100 or other memory area are set to limit, e.g., real time ranges (column 222) that particular application programs on a particular computer can be started and run, and a limit to a length of time that a specific program (or category of programs) can be operated given a number of available credits for a current user.

The user is given credits at a pre-configured rate per hour of usage (column 224) of an application program designated in the usage limiter configuration file as being beneficial, and the user gives back (or loses) credits at a pre-configured rate per hour of usage (column 226) for use of programs designated as non-beneficial.

Preferably, continued usage of beneficial programs is determined in an appropriate matter, e.g., by at least one keystroke or mouse selection per minute in the relevant beneficial program, etc., to avoid allowing a user to earn unearned credits for a beneficial program which is started (e.g., opened in a Windows™ operating system) but not actively being used by the user.

Application programs selected for monitoring in the usage limiter configuration file 100 can be identified on an application by application basis, as a specific category of applications identifiable when the particular application is started, or as being stored in a specific directory (e.g., folder in a Windows™ operating system). as identified in column 220 as shown in FIG. 2.

For example, usage of an educational program, category of programs, or folder of programs may be configured as being "credit giving" applications by placing an appropriate number of credits per hour in column 224 in the usage limiter configuration file 200, and/or by placing a zero in the credits taken per hour column 226 as exemplified by entries 206 and 208 shown in FIG. 2. Similarly, to be pre-configured as a credit-taking program, an appropriate number of credits cost per hour should be a non-zero positive number in the credits taken per hour column 226, while the number of credits given per hour would be zero, as exemplified by entries 202, 204 shown in FIG. 2.

In accordance with the principles of the present invention, at least one beneficial application program pre-configured into an entry in the usage limiter configuration file 200 must be run for a sufficient amount of time to earn at least one credit before a similar amount of time of a non-beneficial application program can be run. In other words, a credit-giving (i.e., beneficial program) must be run by a particular user to earn credits before a credit-taking (i.e., non-beneficial program) can be run by that user. Of course, the principles of the present invention relate equally to providing the user with up-front credits so that they may start with a credit-taking, non-beneficial program until their up-front credits run out.

Up front credits may be provided to a particular user in a user log 400 or other memory storage, as shown in FIG. 3.

In particular, FIG. 3 shows an exemplary association between individual users (or groups of users) and the number of credits that remain in an appropriate entry in the user log 400. Preferably, the credits remaining are unchanged through computer power-downs (i.e., they are non-volatile).

Using the user log 400, a parent or guardian may add or remove a number of credits for any particular user by altering the appropriate user's entry 402–408 in the user log 400. In this way, non-computer related activities may be manually included in the calculation for number of credits earned or lost, e.g., a bad report card from school may prompt a parent or guardian to deduct a certain number of credits for that user irrespective of their use of a beneficial application program.

As an operating example, Dad and Mom have told their son Billy that he can play his non-beneficial karate game as long as he has also been using his beneficial educational game that helps build vocabulary for an equal amount of time. So for every hour that the beneficial vocabulary game has been used, the non-beneficial karate game is permitted to be used based on an equal number of credits given per hour for the vocabulary game as the number of credits taken per hour for the karate game. As his allotted time using the karate game comes to an end, a pop up window indicates that time is running out. At this point, Billy would have time to save the status of the karate game or whatever else he may want to do before the karate game is terminated by the halt signal 137 from the time limiter 104.

Parents or guardians can configure the application usage time limiter 100 to, e.g., send friendly reminders as time expires, or even immediately shut down a program at the end of the allotted period of time.

Application program names may be added to the usage limiter configuration file 100 in any suitable fashion, e.g., by typing the program name into the keyboard, by browsing and selecting the appropriate program, by placement of the executable portion of the application program in a particular folder identified as being subject to the parameters in the configuration file, etc. Preferably, a suitable application program provides a user interface to allow easy changes to the usage limiter configuration file 100. Ideally, changes to the usage limiter configuration file 100 will require a password, e.g., known only to the parent or guardian.

As a further example, this imaginary family includes a daughter Sally. Sally doesn't desire to play otherwise termed non-beneficial games on the computer, but instead tends to play math games for hours on end, to the detriment of other homework or skills. In this case, the application usage time limiter 100 may be configured to only allow her to use the otherwise beneficial math program for a given total amount of time in a day, to provide her with sufficient time to finish other school work, practice her music lessons, read, etc.

In this way, an otherwise beneficial program not conventionally subject to time or other usage limitations can be limited for certain users (e.g., Sally), and encouraged for other users (e.g., Billy).

As this exemplary family gets many non-beneficial and beneficial programs, Mom and Dad can configure categories or lists (and/or computer folders) of programs in the usage limiter configuration file 200 for use by the application usage time limiter 100. This way, for example, Billy can play any non-beneficial game in a given category or folder, but only after using any "crediting" or beneficial game in another folder (e.g., in an educational program category or folder) for a given total amount of time.

Each user can be provided with a separate "account" or user log entry for access by the application usage time limiter 100, as shown in FIG. 3. The computer can query the user for a name and password before allowing access to any programs under its monitoring configuration control.

Monitored usage of programs can similarly be maintained separately for different users by providing separate usage limiter configuration files 200 for separate users.

Preferably, the application usage time limiter 100 not only monitors which application programs are run, but may also monitor to be sure that the beneficial, credit-giving applications programs which are loaded are actually being run over time, e.g., not simply minimized. For instance, the continual program use detector 106 may not only determine if the application program window is not minimized, but it may also make sure that there are occasional mouse or keyboard input to that application program to minimize the likelihood that the child or user is merely opening the "crediting" program without actually operating it throughout the required time.

Moreover, while the present embodiments relate to a measured length of usage, a quality of usage may also be monitored. For instance, the user may be occasionally tested for information retention based on the utilized portions of the beneficial program. The higher the result of the testing, the higher the presumed quality of the usage of the beneficial program.

Usage of a particular application program can be restricted to certain days and hours using column 222 of the usage limiter configuration file 200 shown in FIG. 2. As an example, Mom and Dad may not want anyone accessing the Internet after 10 p.m. In this case, they can configure the usage limiter configuration file 200 to limit the operation of an Internet browser program such as Microsoft Explorer™, Netscape Navigator™, and/or even Internet access programs such as America OnLine™ to the hours between noon and 9 pm, as shown by entry 202 in FIG. 2. These type usage restrictions can apply to all users based on time of day if the usage limiter configuration file 200 applies to all users, or can be based on particular users if separate usage limiter configuration files 200 are implemented.

The monitor of the application usage time limiter can also be used to monitor how long a particular business program, category of business programs, or folder of business programs are being used. For instance, perhaps Mom is doing consulting work and is paid for 20 hours per week. The application usage time limiter can be configured to display a message after 20 hours of use of such programs within a given time frame (e.g., within a week starting on Monday) indicating that the 20 hours has been spent, and that presumably additional time spent that week is being done for free. Overall usage of a particular application, usage by a particular user, etc., can be derived from the entries in a suitable monitor log 300 such as that shown in FIG. 4.

The application usage time limiter 100 can also be used to determine percentages the computer is used for work, investing, and personal use for IRS purposes, based on a designation of particular programs as either work-based, investing-based, and or personal-based, and a compilation of the entries 302–312 in the monitor log 300 shown in FIG. 4. A printed report can be provided for use by an accountant in determining personal and professional tax liabilities. Moreover, the monitor log 300 and/or report can be electronically transferred (e.g., e-mailed) to a desired location, e.g., to a parent's laptop, PDA, or text pager when they are out of town for the weekend and the children are left to use the computer.

Figure 5A:
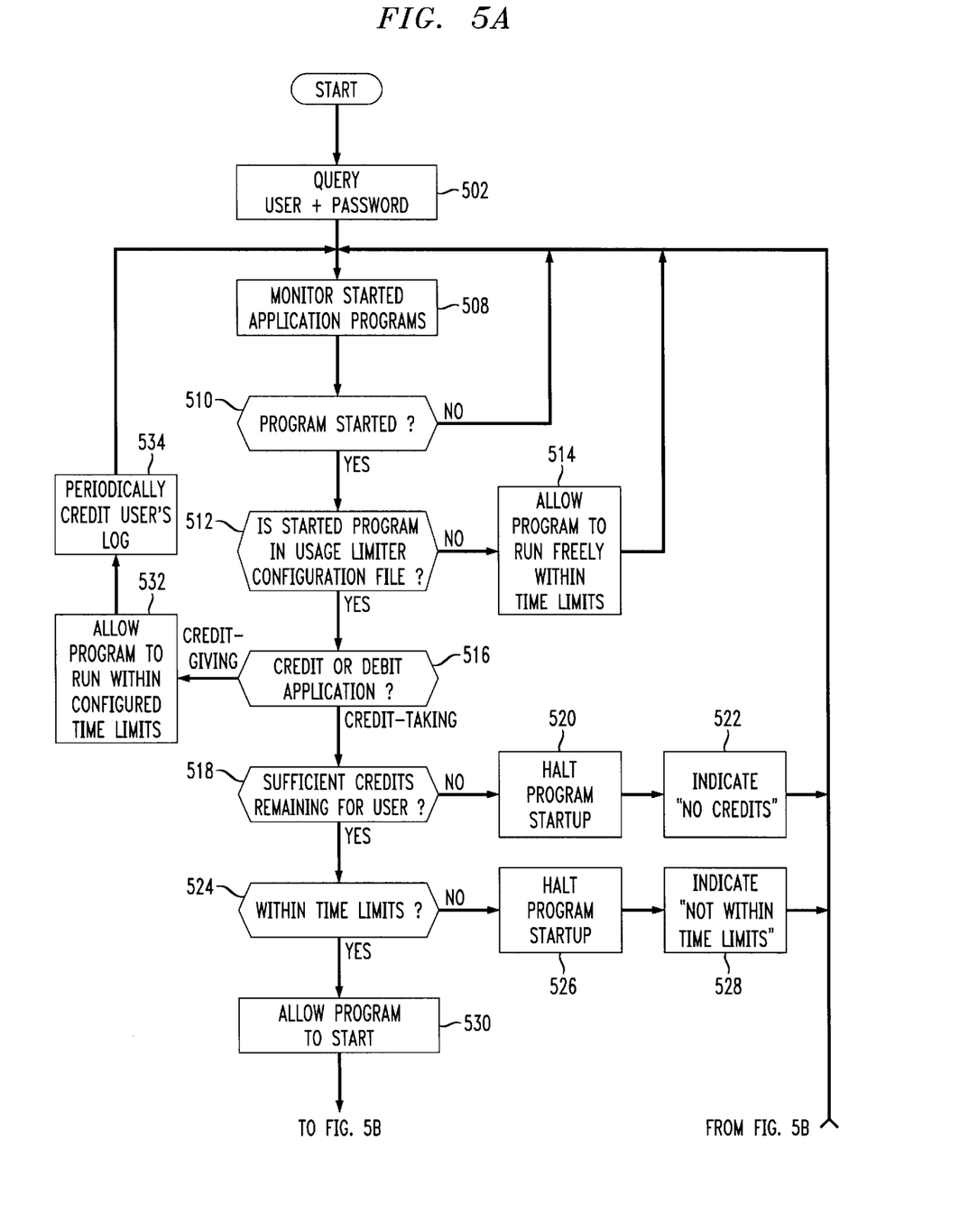
FIGS. 5A and 5B show an exemplary process flow diagram showing operation of the application usage time limiter shown in FIG. 1.
Figure 5B:
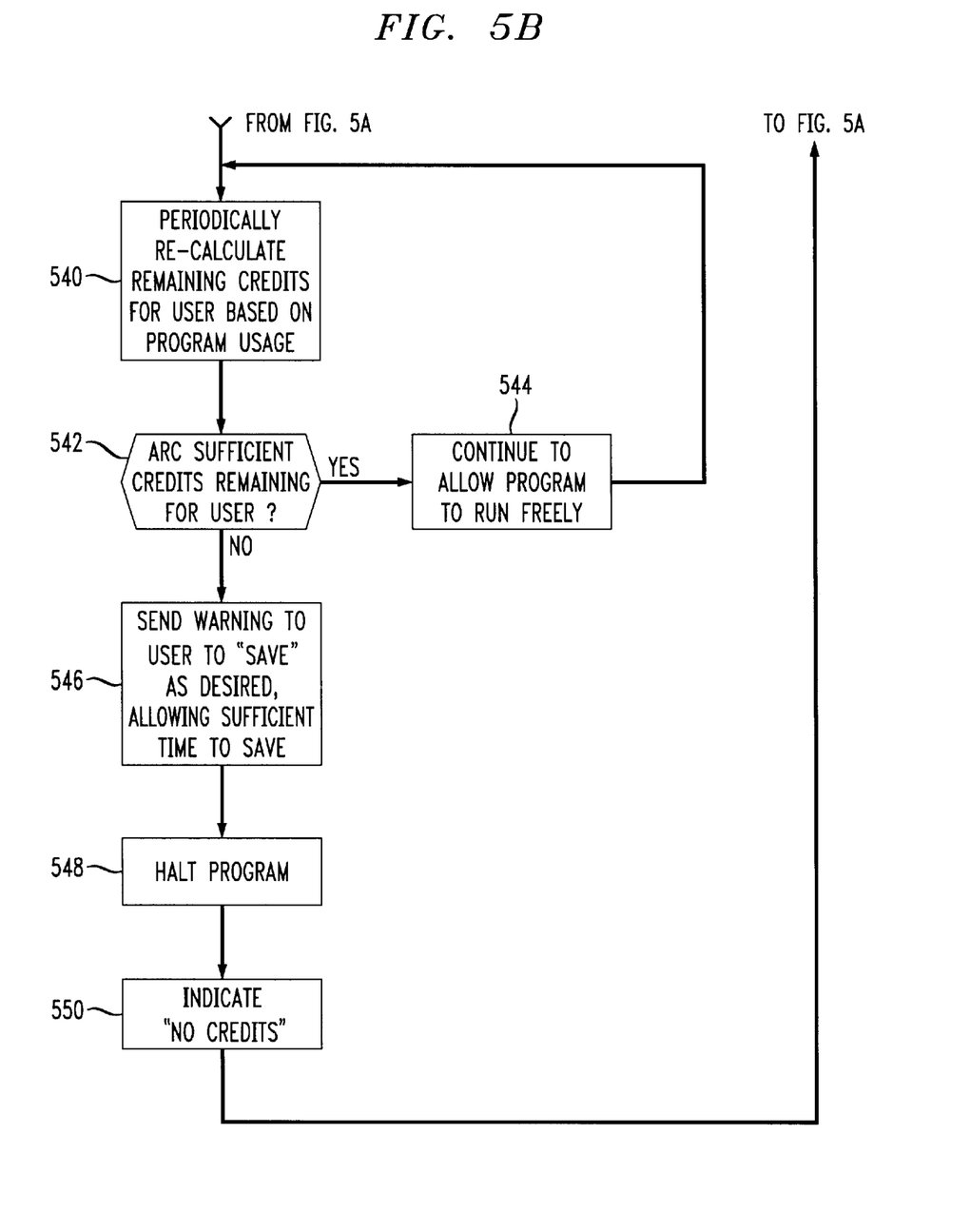

FIGS. 5A and 5B show an exemplary process flow diagram showing operation of the application usage time limiter shown in FIG. 1.

In particular, as shown in FIG. 5A, an application usage time limiter program 100 is started. In step 502, the time limiter 104 queries a user for a user name and password. The user may log out at any time, wherein the process returns to step 502 to query for the user name and password of another user.

In step 508, the time limiter 104 monitors the operating system for started programs.

In step 510, the time limiter 104 determines if an application program has started. If not, the process returns to step 508. However, if an application has been started, the process proceeds to step 512.

In step 512, the time limiter 104 determines if the started program corresponds to any entry in the relevant usage limiter configuration file 200 for that user. If the started program corresponds to more than one entry in the usage limiter configuration file 200, a default entry is used, e.g., the first matching entry.

If the started program is not listed in the usage limiter configuration file 200 and therefore not monitored by the time limiter 104, then the started application program is allowed to run freely, as shown in step 514. However, if the started application is to be monitored, the process proceeds to step 516.

In step 516, the time limiter 104 determines whether the started, monitored application program is a credit-giving or a credit-taking (i.e., debit) program.

If the started, monitored program is a credit-giving program, in step 532, the program is allowed to run within configured time limits.

In step 534, a user's log is periodically credited with appropriate credits as determined by the configured entry in the relevant usage limiter configuration file 200. Step 534 repeats as long as the credit-giving application is run within the allowed time periods. Moreover, the time limiter 104 monitors for the startup of additional programs as indicated by the process returning to step 508.

If the started, monitored application program is a credit-taking program, in step 518 it is determined whether or not there are sufficient credits remaining for the successfully logged in user.

If there are insufficient credits for the logged in user, in step 520 the halt signal 137 is output by the time limiter 104 (with appropriate time delay to allow the user sufficient time to save the program parameters) as shown in step 520, and an indication of "no credits remaining" or similar is provided in step 522. The process then returns to monitor for the startup of a new application program (presumably a credit-giving application if any), or for a logout and login of a new user.

In step 524, the time limiter 104 determines if the started, monitored program having sufficient credits is within allowed time limits (as determined from column 222 of the usage limiter configuration file 200). If not, the halt signal 137 is output by the time limiter 104 (with appropriate time delay to allow the user sufficient time to save the program parameters) as shown in step 526, and an indication of "not within time limits" or similar is provided in step 528. The process then returns to monitor for the startup of a new application program (presumably a credit-giving application if any), or for a logout and login of a new user.

If the started, monitored program is within appropriate time limits, then the program is allowed to continue to run as shown in step 530.

FIG. 5B continues the process flow shown in FIG. 4.

In step 540 of FIG. 5B, the remaining credits for the logged in user are periodically re-calculated, and the user log 400 is updated to reflect the re-calculations, based on program usage.

In step 542, the time limiter 104 determines if there are sufficient credits remaining for the relevant user.

If so, in step 544, the program is allowed to continue to run, and the process returns to step 540 to allow periodic credit re-calculations.

If not, in step 546, a warning message is sent to the user that they must save their program parameters now or risk loosing important information.

In step 548, after a short period of time, the relevant application program is halted.

In step 550, an indication of "no credits" or similar is provided to the user, and the process returns to step 508 to monitor for another started application (or for a logout of the user and login of another user).

The application usage time limiter in accordance with the principles of the present invention encourages or imposes balanced computer usage in the home, e.g., by monitoring specific application usage. Moreover, unused programs (ever a period of absolute time and/or computer usage time) can be flagged and removed using an appropriate software removal utility, e.g., as provided with WINDOWS™ 98 and similar operating system programs, to free up disk space. The application usage time limiter can implement time-based restrictions to Internet usage, so your kids aren't up all night, e.g., in a chat room.

The present invention includes applications run on computer devices separate from the computer device on which the application usage time limiter is being run. For instance, a CD ROM game station may input information to a serial port of the computer device (i.e., PC) running the application usage time limiter. Ideally, this serial connection between the CD ROM game station and the PC running the application usage time limiter will include a control protocol wherein the PC can halt or terminate operation of a particular game being played on the CD ROM game station and prevent further usage until a configured number of "credits" have been earned, e.g., using an educational program on the PC.

Increased security of the application usage limiter may be implemented within the principles of the present invention. For instance, if a time limited program is uninstalled in an attempt to bypass the usage limitations, and then re-installed afterwards, such un-installations and re-installations can be informed to the parent or guardian, e.g., in the monitor log 300. Moreover, to prevent alteration of the system real-time clock in an attempt to extend usage of non-beneficial programs or reduce actual time spent on beneficial programs, an alternative, internal real-time clock which can be adjusted only by the parent or guardian with a password can be implemented in the background.

While the invention has been described with reference to the pausing or termination of a non-beneficial program at a suitable time, the principles of the present invention apply equally to applications where suitable messages and warnings are provided to the user, but in which no program termination is necessary. Similarly, the usage limiter in accordance with the principles of the present invention may simply provide a log of beneficial and non-beneficial use to a parent or guardian, preferably on a user-by-user basis.

While the invention has been described with reference to the exemplary embodiments thereof, those skilled in the art will be able to make various modifications to the described embodiments of the invention without departing from the true spirit and scope of the invention.

What is claimed is:

1. An application usage time limiter, comprising:
 a time limiter; and
 a usage limiter configuration file including at least one entry associating an educational application program with a number of credits given based on usage of said educational software application program, and at least one entry associating a non-educational software application program with a number of credits taken away based on usage of said non-educational software application program;

wherein said application usage time limiter limits use of said non-educational software application program based on a number of available credits for a particular user.

2. The application usage time limiter according to claim 1, further comprising:

a continual program use detector adapted to detect continual use of said educational software application program.

3. The application usage time limiter according to claim 1, wherein:

said time limiter outputs a halt signal to an operating system to terminate operation of said non-educational software application after a predetermined number of credits for said particular user are exhausted.

4. The application usage time limiter according to claim 1, further comprising:

a monitor log adapted to contain entries relating to use of at least one of said educational software application program and said non-educational application program.

5. The application usage time limiter according to claim 1, further comprising:

a user file associating a number of available credits for said particular user.

6. The application usage time limiter according to claim 1, wherein:

said educational software application program is operated on a separate processor than said non-educational software application program.

7. The application usage time limiter according to claim 6, further comprising:

an external interface to allow information regarding usage of said educational software application program on said separate processor to be communicated to said time limiter.

8. The application usage time limiter according to claim 1, wherein:

said application usage time limiter is a front end for at least one of said educational software application program and said non-educational software application program.

9. The application usage time limiter according to claim 1, wherein:

said application usage time limiter is a background program operated in a multi-tasking operating system of a computer.

10. A method of limiting usage of a non-educational application program on a computer, comprising:

monitoring a usage of an educational software application program; and crediting a usage of a non-educational software application program based on said monitored amount of usage of said educational software application program.

11. The method of limiting usage of a non-educational application program on a computer according to claim 10, wherein:

said usage of said non-educational software application program is monitored for a particular user of said computer.

12. The method of limiting usage of a non-educational application program on a computer according to claim 10, wherein:

said monitoring monitors an amount of usage.

13. The method of limiting usage of a non-educational application program on a computer according to claim 12, wherein:

said amount of usage is measured in time.

14. The method of limiting usage of a non-educational application program on a computer according to claim 13, wherein:

said time is measured starting substantially from when said non-educational software application program is commenced.

15. The method of limiting usage of a non-educational application program on a computer according to claim 12, wherein:

said amount of usage is measured in an amount of user input.

16. The method of limiting usage of a non-educational application program on a computer according to claim 15, wherein:

said user input is keystrokes.

17. The method of limiting usage of a non-educational application program on a computer according to claim 10, wherein:

said monitoring monitors a quality of usage.

18. The method of limiting usage of a non-educational application program on a computer according to claim 17, wherein:

said quality is determined by an evaluation of associated learning by said user.

19. The method of limiting usage of a non-educational application program on a computer according to claim 10, further comprising:

restricting operation of at least one of said educational software application program and said non-educational software program to within a configured time of day.

20. The method of limiting usage of a non-educational application program on a computer according to claim 10, further comprising:

terminating operation of said non-educational software application program after said credited amount of allowed usage is exhausted.

21. Apparatus for limiting usage of a non-educational application program on a computer, comprising:

means for monitoring an amount of usage of a an educational software application program; and means for crediting an amount of allowed usage of a non-educational software application program based on said monitored amount of usage of said educational software application program.

22. The apparatus for limiting usage of a non-educational application program on a computer according to claim 21, wherein:

said means for monitoring monitors an amount of usage of said educational software application program for a particular user of said computer.

23. The apparatus for limiting usage of a non-educational application program on a computer according to claim 21, further comprising:

means for restricting operation of at least one of said educational software application program and said non-educational software program to within a configured time of day.

24. The apparatus for limiting usage of a non-educational application program on a computer according to claim 21, further comprising:

means for terminating operation of said non-educational software application program after said credited amount of allowed usage is exhausted.

* * * * *